United States Patent

[11] 3,609,223

[72] Inventors Hisao Tajiri
Sagamihara-shi;
Shigeo Tanaka, Kawasaki-shi, both of Japan

[21] Appl. No. 681,186
[22] Filed Nov. 7, 1967
[45] Patented Sept. 28, 1971
[73] Assignee Tokyo Shibaura Electric Co., Ltd.
Kawasaki-shi, Japan
[32] Priority Nov. 12, 1966, Nov. 14, 1966, July 14, 1967, Sept. 4, 1967
[33] Japan
[31] 41/74062, 41/74418, 42/45039 and 42/56373

[54] VIDEO TAPE RECORDER DEVICE UTILIZING SINGLE MAGNETIC HEAD
9 Claims, 12 Drawing Figs.

[52] U.S. Cl. 178/5.4 CD, 178/6.6 A, 179/100.2 S
[51] Int. Cl. H04n 5/78, G11b 5/04
[50] Field of Search 178/5.4 CR, 5.2, 6.6 A, 5.4

[56] References Cited

UNITED STATES PATENTS

| | | | |
|---|---|---|---|
| 2,811,578 | 10/1957 | Rieke | 178/5.2 |
| 3,095,472 | 6/1963 | Dolby et al. | 178/5.4 |

*Primary Examiner*—Robert L. Griffin
*Assistant Examiner*—John C. Martin
*Attorney*—Stephen H. Frishauf

ABSTRACT: A video tape recorder device for use with color television signals including luminance and chrominance signal components which are to be recorded on a magnetic tape and reproduced therefrom, utilizing a pilot signal for obtaining color television signals free from phase variation, and utilizing a quasi-subcarrier wave for reducing the bandwidth of the color television signals to be recorded on the magnetic tape and reproduced therefrom relative to the bandwidth of the original color television signals.

HISAO TAJIRI &
BY SHIGEO TANAKA,
INVENTORS
Stephen H. Frishauf
Atty

VIDEO TAPE RECORDER DEVICE UTILIZING SINGLE MAGNETIC HEAD

This invention relates to a video tape recorder for color television signals of the NTSC system containing both luminance signals representing the tone of the picture image, and chrominance signals produced by modulating a color subcarrier wave with color signals.

Generally when recording and reproducing color television signals to and from a magnetic video tape the phase of the chrominance signal component in the reproduced color television image signals is fluctuated with the result that the reproduced picture of the television receiver is degraded by color shading.

Various methods have been used to prevent such color shading to the reproduced picture caused by the phase fluctuation of the chrominance signals.

One approach involved in the use of a signal of a predetermined frequency as the pilot signal which is recorded on the same magnetic medium together with other color television signals.

More particularly, where the pilot signals are recorded together with a color television signal containing a luminance signal and a chrominance signal, and the chrominance signal is subjected to phase fluctuation at the time of its reproduction, the pilot signal that has been recorded simultaneously would be reproduced with a varied component corresponding to the component of the chrominance signal that has been subjected to phase fluctuation.

These chrominance and pilot signals subjected to similar phase fluctuation are segregated and are then mixed by a circuit in such a relationship that their varied components would cancel each other.

Thus, the chrominance signal with its varied component compensated is reproduced by mixing two signals having identically varied components and the reproduced chrominance signal is supplied to a color television receiver together with the luminance signals representing the contrast of the picture, thus reproducing the same.

However, when using the pilot signal for the purpose of compensating the phase fluctuation of the chrominance signal it has been the practice to record the luminance signal, chrominance signal and pilot signal on independent tracks of a magnetic tape by means of independent magnetic heads. Thus, it is necessary to use separate magnetic heads for recording these three types to signals thus not only increasing the number of magnetic heads but also complicating the construction and increasing the cost of manufacturing.

Further, the circuit construction is complicated as it is necessary to use independent circuits for respective heads. The quantity of magnetic tape utilized is also increased because it is necessary to record respective signals on separate tracks of the magnetic tape.

It is an object of this invention to provide a novel video tape recorder system wherein the color television signal and the pilot signal are recorded on a magnetic tape by means of the same magnetic head.

Another object of this invention is to provide a novel video tape recorder system of simplified mechanical and circuit construction.

Still another object of this invention is to provide a video tape recorder system capable of recording color television signals in a narrow frequency band.

The features of the invention which are believed to be novel are set forth with particularity in the appended claims. The invention itself, however, as to its organization together with further objects and advantages thereof, may best be understood by reference to the following description taken in connection with the accompanying drawings, in which:

FIGS. 2 and 3 are block diagrams illustrating a basic video tape recorder to obtain a color television signal free from phase variation wherein FIG. 2 represents a circuit diagram to explain the recording operation and FIG. 3 is a circuit diagram to explain the reproducing operation;

Figure 11A:
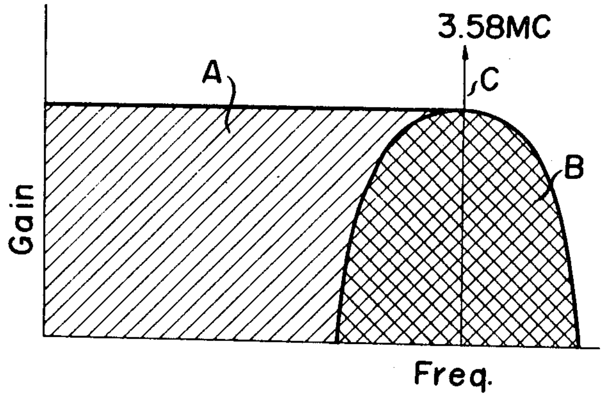
Figure 11B:
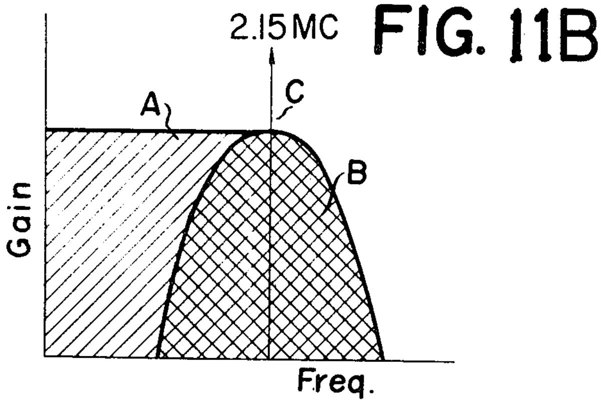

FIG. 11A illustrates the frequency distribution of color television signals of the NYSC type before the frequency of the subcarrier wave is converted by the video tape recorder system of the invention; and FIG. 11B represents the frequency distribution of color television signals after the frequency of the subcarrier wave contained in the television signals shown in FIG. 11A is converted by said system.

Figure 1:
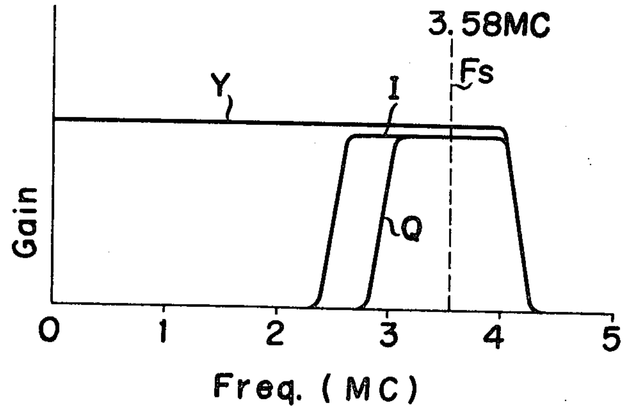
FIG. 1 illustrates the frequency distribution of television signals of the NTSC type.

Referring now to the accompanying drawing, FIG. 1 shows the frequency distribution of an image signal. This distribution includes a luminance signal Y representing the contrast of the picture elements and color signals I (0.5 mc. (1.5 modulating a subcarrier wave (fs) having a frequency of 3.579545 mc. (hereinafter abbreviated as 3.58 mc.) thereby forming chrominance signals.

The luminance signal is distributed over a bandwidth of approximately 0 to 4 mc. Though the chrominance signals essentially have two frequency categories of approximately 0.5 mc. and −15 mc. (single side-band) about the subcarrier frequency fs, the chrominance signals are reproduced, as well known, in a general color television receiver at a single frequency category of approximately ±0.5 mc. due to the reproduced color picture image using said ±0.5 mc. frequency. There results little difference in color from the case where both frequency categories are jointly employed. This is also done for the purpose of simplifying the circuitry.

Figure 2:
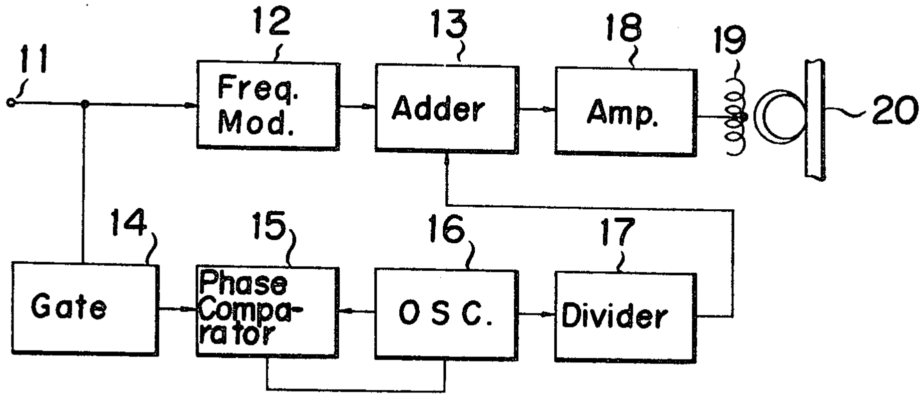

The color television signal having a frequency distribution as above described is supplied to a terminal 11 shown in FIG. 2 and then to a frequency modulator 12 to effect frequency modulation of a carrier wave of a predetermined frequency. The carrier wave modulated by the frequency modulator 12 is applied to an adder circuit 13.

A portion of the television signals supplied to terminal 11 is applied to a burst signal gate circuit 14 to extract burst signals contained in the television signal.

These extracted burst signals have a frequency of 3.58 mc. which is the same as that of said subcarrier frequency fs and are applied to the succeeding phase comparator 15. A signal having substantially the same frequency as that of the subcarrier wave is supplied to the phase comparator 15 from an oscillator 16 and the phase of this signal is compared by the phase comparator with that of the burst signal. Any error signal component produced by the phase comparison of these two signals is fed back to the oscillator to control the frequency of the oscillation produced thereby. As a result the oscillator 16 produces a signal whose phase is synchronized with that of burst signals contained in the color television signal applied from outside.

The signal from the oscillator 16 is supplied to a frequency divider 17 to reduce its frequency to $1/n$, where n is selected such that the reduced frequency of the signal generated by the oscillator 16 is lower than the distributed frequency of the modulated wave from the frequency modulator 12.

This output of reduced frequency from the frequency divider 17 is supplied as the pilot signal to said adder circuit 13 and added therein to said modulated wave.

Figure 3:
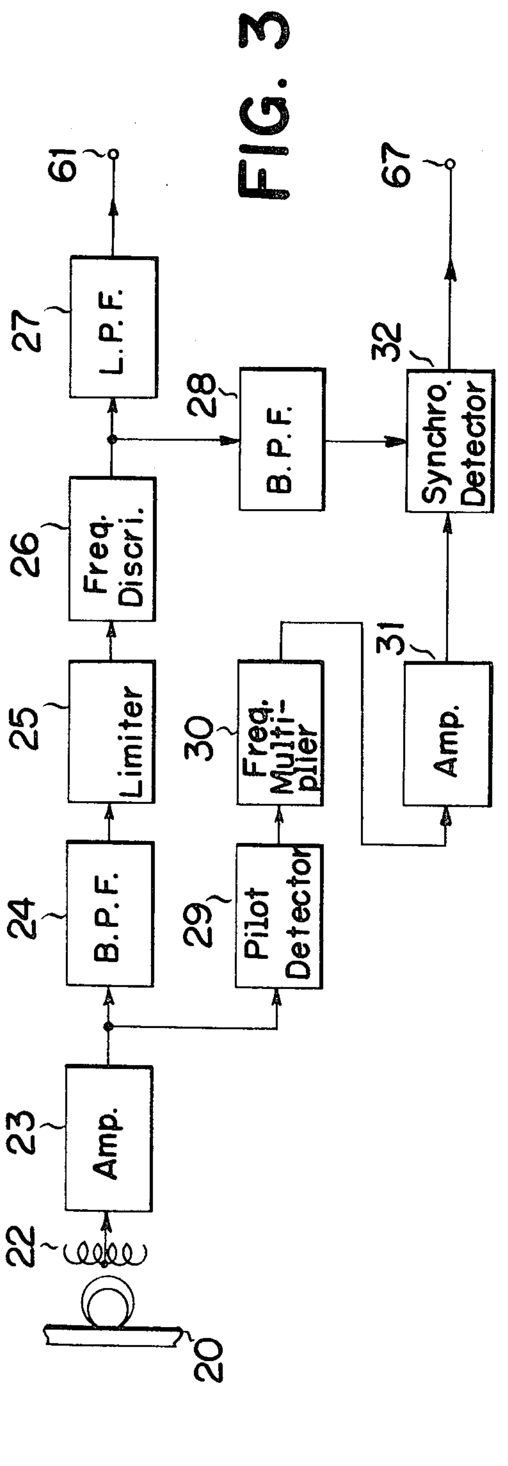

The sum of the modulated wave and the pilot signal provided by the adder circuit 13 is supplied to a common magnetic head 19 through an amplifier 18 to be magnetically recorded on a magnetic tape 20. The operation for reproducing the signal recorded on the magnetic tape 20 will now be described with reference to FIG. 3.

The color television signal and the pilot signal recorded on the magnetic tape 20 are reproduced by a magnetic head 22 positioned close to the surface of the tape 20.

Signals reproduced by the magnetic head 22 are amplified by an amplifier 23 and are then supplied to a band-pass filter 24 which operates to block the pilot signal component and pass only the television signal component. After being limited in its amplitude by a limiter 25, the television signal component is then supplied to a frequency discriminator 26 which serves to demodulate the color television signal.

The demodulated color television signal is supplied to a low-pass filter 27 and a band-pass filter 28. The low-pass filter 27 passes the luminance signal component in the low frequency region of the color television signal while the band-pass filter 28 is set to pass frequency components distributed close to the subcarrier frequency thus providing the chrominance signal.

Where the magnetic tape sways relative to the magnetic head at the time records are reproduced, the band-pass filter 28 will undergo phase variations in response to the magnitude of the aforesaid sways.

The pilot signal contained in the television signal passed through the amplifier 23 is detected by a pilot signal detector 29 and is then supplied to a frequency multiplier 30 to increase its frequency by the factor of n. Accordingly, the frequency of the pilot signal on the output side of the frequency multiplier 30 is the same as that of the subcarrier wave and thus equals to 358 mc.

Where there is a phase fluctuation in the chrominance signal supplied by the band-pass filter 28 the pilot signal will have the identical phase varied component as that of the chrominance signal because these two signals are recorded on and reproduced from the same magnetic tape by the same magnetic head.

Consequently, the pilot signal whose frequency has been multiplied by the frequency multiplier 30 would have been subjected to the same phase shift as the chrominance signal extracted by the band-pass filter 28. After amplifying the amplifier 31, the pilot signal is applied to a synchronous detector 32 to be synchronously detected by the chrominance signal supplied from the band-pass filter 28 to reproduce the original chrominance signal, the component representing phase variation thereof has been compensated for.

Thus by supplying the luminance signal obtained from the low-pass filter 27 and the chrominance signal from the synchronous detector to a color television receiver a picture image free of any phase fluctuation can be reproduced.

While in the foregoing apparatus the modulated wave produced by modulating a carrier wave with the color television signal and pilot signal are recorded on a recording medium by the same magnetic head, cross modulation may be resulted due to the nonlinearity of the hysteresis characteristic of the magnetic tape where two signals are recorded by the same magnetic head as above-described.

However we have found that said cross modulation can be prevented by selecting the value of the recording current for the modulation wave and pilot signal to be in a certain range.

Figure 4:
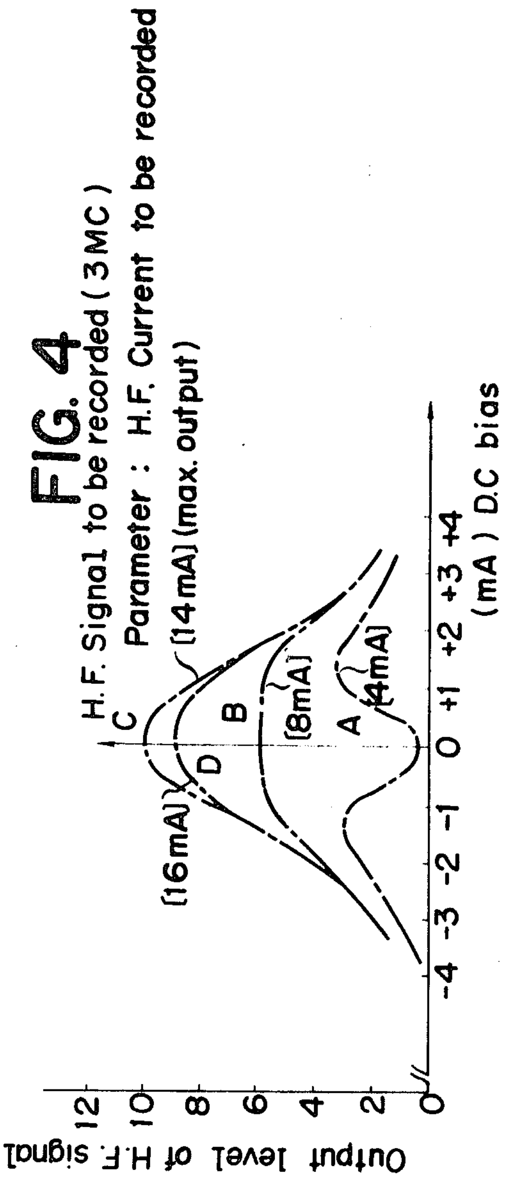
FIGS. 4 to 7 show characteristic curves to explain the method of selecting the value of recording current at the time of recording by means of a magnetic head.
Figure 5:
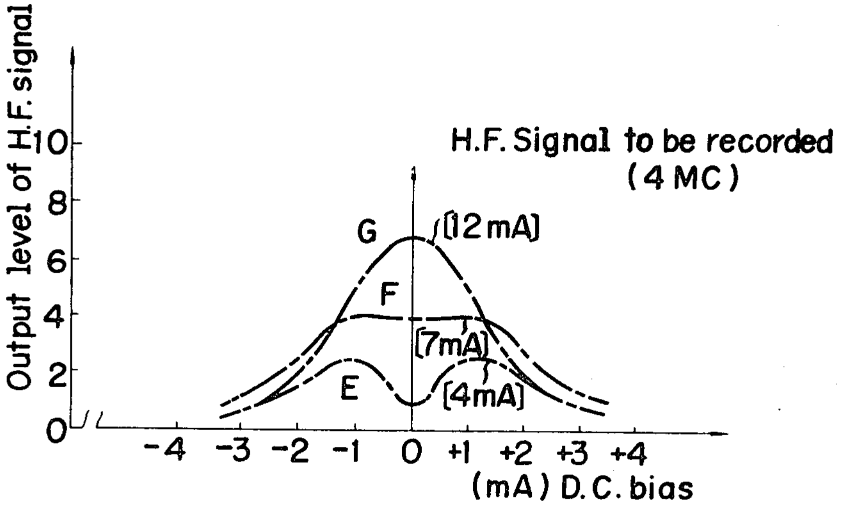

More specifically it was noticed that when a high frequency signal was recorded and reproduced at various values of current with favorable DC bias its reproduced output varied as shown in FIGS. 4 and 5.

For example, FIG. 4 shows variation of the reproduced output when the high-frequency recording signal of 3 mc. is recorded at various values. The abscissa represents the magnitude of the DC bias current in mA while the ordinate the reproduced output level.

Curve A shows the relationship for the recording current of 4 ma, while curves B, C and D these for recording currents of 8ma, 14ma, and 16ma, respectively. For small recording current, the curve A of the reproduced output has a valley near zero bias with hills on both sides. As the value of the recording current increases the depth of the valley becomes shallower until a flat curve is obtained and then the curve becomes a hill near zero bias. Thus the maximum output can be obtained at the recording current of 14 ma. However, increase of the recording current beyond this value does not result in the increase in the output, but instead results in the decrease thereof.

FIG. 5 is a graph similar to that shown in FIG. 4 which shows the output level of a high-frequency signal of 4mc., by taking the value of the recording signal as the parameter. Similarly, the abscissa represents the magnitude of the DC bias in m and the ordinate the reproduced output level.

Curves E, F and G show the relationships for recording currents of 4ma., 7ma. and 12ma, respectively. Identical to the case of FIG. 4 for small recording current the curve E has two hills on both sides of a valley and as the recording current increases the depth of the valley gradually decreases until finally a hill is formed near zero bias.

When considering the case wherein both a high-frequency signal and a low-frequency signal are recorded it can be considered that the DC bias represented by the abscissa shown in FIGS. 4 and 5 corresponds to the instantaneous level of the low-frequency signal.

Accordingly, from the characteristics shown in FIGS. 4 and 5, it can be noted that there is a recording current at which the high-frequency signal will not be subjected to amplitude variation where both the high-frequency signal and the low-frequency signal are recorded on the same magnetic tape by the same magnetic head.

Figure 6:
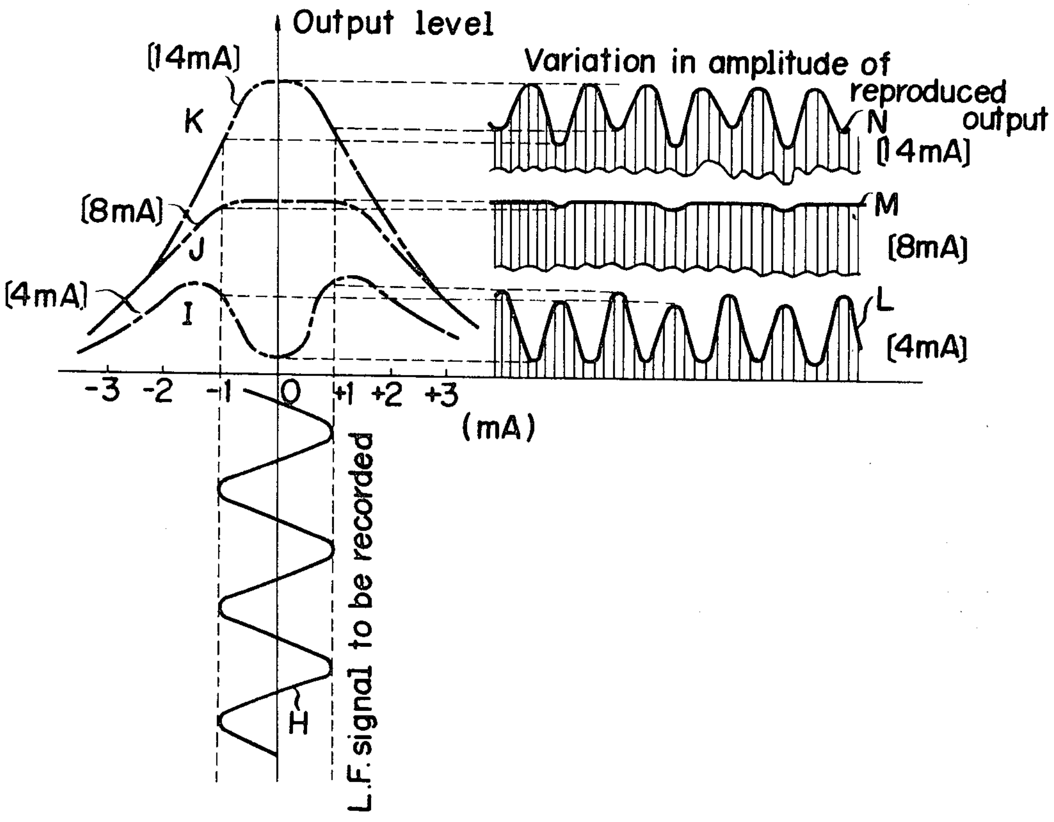

FIG. 6 shows this fact. Thus, by representing signal by curve H, variations the reproduced output level of the high-frequency signal for recording currents of 4ma, 8ma. and 14 ma. can be shown by curves I, J and K respectively so that their reproduced outputs are shown by curves L, M and N, respectively, shown the right-hand side.

As can be clearly noted from FIG. 6, when the frequency of high-frequency signal is 3mc. and the low-frequency signal varies in the range of ±1ma. and when the value of the high-frequency recording current is 8 ma., the variation in the amplitude of the reproduced output is minimum where the high and low-frequency signals are recorded simultaneously.

According to our experiment the value of the recording current which assures minimum amplitude variation of the reproduced output is about one-half of the value of the recording current which provides the maximum output.

Figure 7:
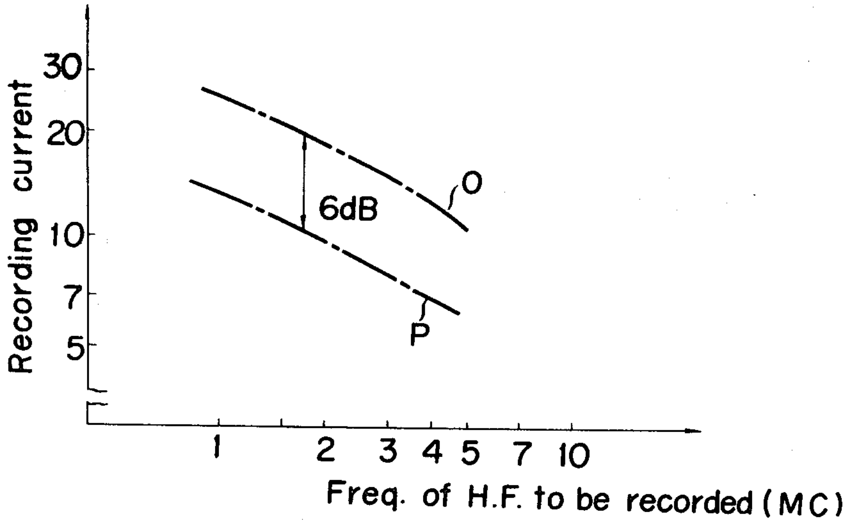

FIG. 7 shows the result of this experiment. The abscissa represents the frequency of the high-frequency signal to be recorded and the ordinate represents the recording current of the high-frequency signal. Curve O represents the variation of the recording current for obtaining the maximum reproduced output and curve P shows the variation of the recording current which assures maximum width of the flat portion of the reproduced output characteristic.

The result of experiment shown in FIG. 7 shows that it is desirable to obtain as large as possible reproduced output and that to make the amplitude variation as small as possible. As a result it is desirable that the recording current of the high-frequency signal is in a range of from the maximum value of the reproduced output to about one-half thereof.

As described hereinabove, where the pilot signal is recorded simultaneously with the color television signal the recording bandwidth is desired to be more narrow. A suitable method for recording the color television signal in a frequency range of narrow bandwidth will be described hereunder with reference to FIG. 8.

There is applied to an input a color television image signal containing a luminance signal and a chrominance signal obtained by modulating a subcarrier wave of 3.58 mc. with a color signal.

The television image signal applied to the terminal 41 is amplified by an amplifier 42 and is then supplied to a low-pass filter 43 to reproduce only the luminance signal component distributed in a relatively low-frequency region.

Though the luminance signal is essentially distributed over a bandwidth of approximately 0 to 4 mc. the invention allows only the luminance signal component distributed in a relatively low-frequency region of the luminance signal to be recorded on a magnetic tape and reproduced therefrom by setting, for example, the subcarrier frequency at 2.15 mc., as later described, instead of 3.58 mc. as used in the prior art and the cutoff frequency of the low-pass filter 43 at 2.2 mc. The luminance signal is interleaved with the chrominance signal by defining, as described hereinafter, the subcarrier frequency at odd times one-half of the frequency of the horizontal synchronizing signal. Thus the cutoff frequency of the low-pass filter 43 is preferably set at 2.2 mc. when the subcarrier frequency is selected to stand at 2.15 mc. as above described. This is because the cross color on the reproduced color picture image is presented too prominently if the frequency band in which the chrominance signal prevails is fully overlapped on the cutoff frequency of the low-pass filter 43, and also the power of resolving the reproduced color picture image is reduced due to the nonoverlapping of the frequency band including the chrominance signal on the cutoff frequency of the low-pass filter 43. Where the chrominance signal is interleaved with the luminance signal, it is ideal to substitute, as well known, a comb filter for said low-pass filter 43 in consideration of the electrical performance thereof. In practice, however, the indicated low-pass filter is used to simplify the circuitry and to save costs.

The luminance signal passed through the low-pass filter 43 is supplied to a mixer 44. The output from said amplifier 42 is also supplied to a band-pass filter 45 which is designed to pass components distributed close to the subcarrier wave thus mainly providing the chrominance signal. The chrominance signal is then applied to a balanced modulator 46 to be mixed with a modulated signal of 5.73 mc. supplied from the amplifier 47.

The converted signal is generated as follows:

An oscillator 48 is provided to generate a signal having the same frequency as the subcarrier wave in the color television signal, said generated signal being supplied to balanced modulator 49 which is also supplied with a quasi-subcarrier wave of 2.15 mc. for example, generated by a divider and a multiplier. Thus the mixer 49 operates to mix said oscillation signal and the quasi-subcarrier wave to form a signal having a frequency of the sum, for example. This signal is the converted signal applied to the balanced modulator 46 through an amplifier 47.

In the modulator 46 the chrominance signal from the band-pass filter 45 and said converted signal are mixed so that the chrominance signal is frequency converted into a signal distributed around a frequency of 2.15 mc. which is the difference frequency between said two mixed signals.

The chrominance signal frequency converted in this manner is elected by a succeeding band-pass filter 51 and is then supplied to the mixer 44.

In the mixer 44 the frequency converted chrominance signal is mixed with the luminance signal passed through the low-pass filter 43. The mixed or resultant signal is then introduced into a frequency modulator 52 to modulate a carrier wave of a predetermined frequency. The frequency modulated wave is then applied to a mixer 53 to be superposed upon he pilot signal supplied through an amplifier 54.

With reference now to the pilot signal this signal is formed by reducing the frequency of the quasi-subcarrier wave generated by said subcarrier oscillator 50 to 1/6(=2.15mc./6 =358 KC) by means of a frequency divider 55.

The pilot signal formed in this manner is superposed upon the modulated wave containing the color television signal in the mixer 53 and is then supplied to a head-tape system 56 to be recorded on a magnetic tape by means of the same magnetic head.

Reproduction of the signal recorded on the magnetic tape is performed in the following manner.

The reproduced signal is supplied to a demodulator 57 from the head-tape system 56 to be demodulated. The demodulated signal contains the chrominance signal and the luminance signal, the latter signal being supplied to a mixer 59 through a succeeding low-pass filter 58.

The chrominance signal in the reproduced television signal is supplied to a balanced modulator 61 through a band-pass filter 60. The chrominance signal is subjected to frequency conversion in the balanced modulator 61 to return to the original frequency region of the chrominance signal and compensated for the phase fluctuation produced at the time of the reproduction.

Frequency conversion of the chrominance signal back to the original frequency region and the compensation for the component representing phase variation are effected in he following manner.

Thus the pilot signal contained in the signal reproduced from the head-tape system 56 is separated by a pilot signal detector 62 and is then applied to a frequency multiplier 64. This multiplier 64 functions to multiply the frequency of the pilot signal by the factor of 6 thus producing a signal having a frequency of 2.15 mc. As the pilot signal and the chrominance signal are recorded and reproduced by the same magnetic head where the chrominance signal had been subjected to a phase fluctuation, the pilot signal would have been subjected to the same phase fluctuation.

The pilot signal which has been frequency converted by the frequency multiplier 64 is applied to a balanced modulator 65, through amplifier 63 where it is mixed with an oscillation signal of 3,58mc. supplied from an oscillator 66 to form a converted signal having a frequency of 5.73 mc. which is the sum. Thus the converted signal would have the same phase fluctuation when the chrominance signal was subjected to phase fluctuation.

The converted signal is applied to the modulator 61 via an amplifier 67 and it is with the chrominance signal distributed around a frequency of 2.15 mc. supplied by the band-pass filter 60.

The modulator in which the chrominance signal and the converted signal are mixed together supplies a signal whose frequency has been converted to that of the chrominance signal distributed around 3.58 mc. or the difference frequency between said two signals.

Phase fluctuation of the chrominance signal will now be considered.

When the phase of the chrominance signal varies the pilot signal will also be subjected to the same phase fluctuation.

As a result, two signals having identical phase fluctuation components are mixed in the modulator 61 thus cancelling out components representing phase variation.

We wish to express the reproduced subcarrier chrominance signal $S_{fc}$ and the frequency multiplied pilot signal $S_{mp}$ as follows.

$S_{fc}=f+\Phi+\delta$ $S_{mp}=f+\delta$ where $f$ is the new subcarrier frequency, $\Phi$ the color phase signal, and $\delta$ the phase fluctuation components by jitter.

The sum frequency signal $Si$ of $S_{mp}$ and 3.58 mc. and $S_{fc}$ are mixed to cancel out $\delta$ and obtain pure $\Phi$ signal in 3.58 mc.

$S_1=3.58+S_{mp}=3.58+f+\delta$ $S_{fc}\approx S_1=(f+\Phi+\delta)\approx(3.58+f+\delta=3.58-\Phi$ The chrominance signal which has been frequency converted back to the original frequency region and compensated for the components representing phase fluctuation is supplied to the mixer 59 through a band-pass filter 58 and mixed with the luminance signal passed through the low-pass filter 58. Thus, the normal color television signal of NTSC system is restored by the mixer 59.

While a portion of the high-frequency region of the luminance signal in the restored color television signal is lost, this causes no trouble in the practical use.

The color television signal restored as above is then supplied to a color television receiver 69 to reproduce the picture image.

Figure 8:
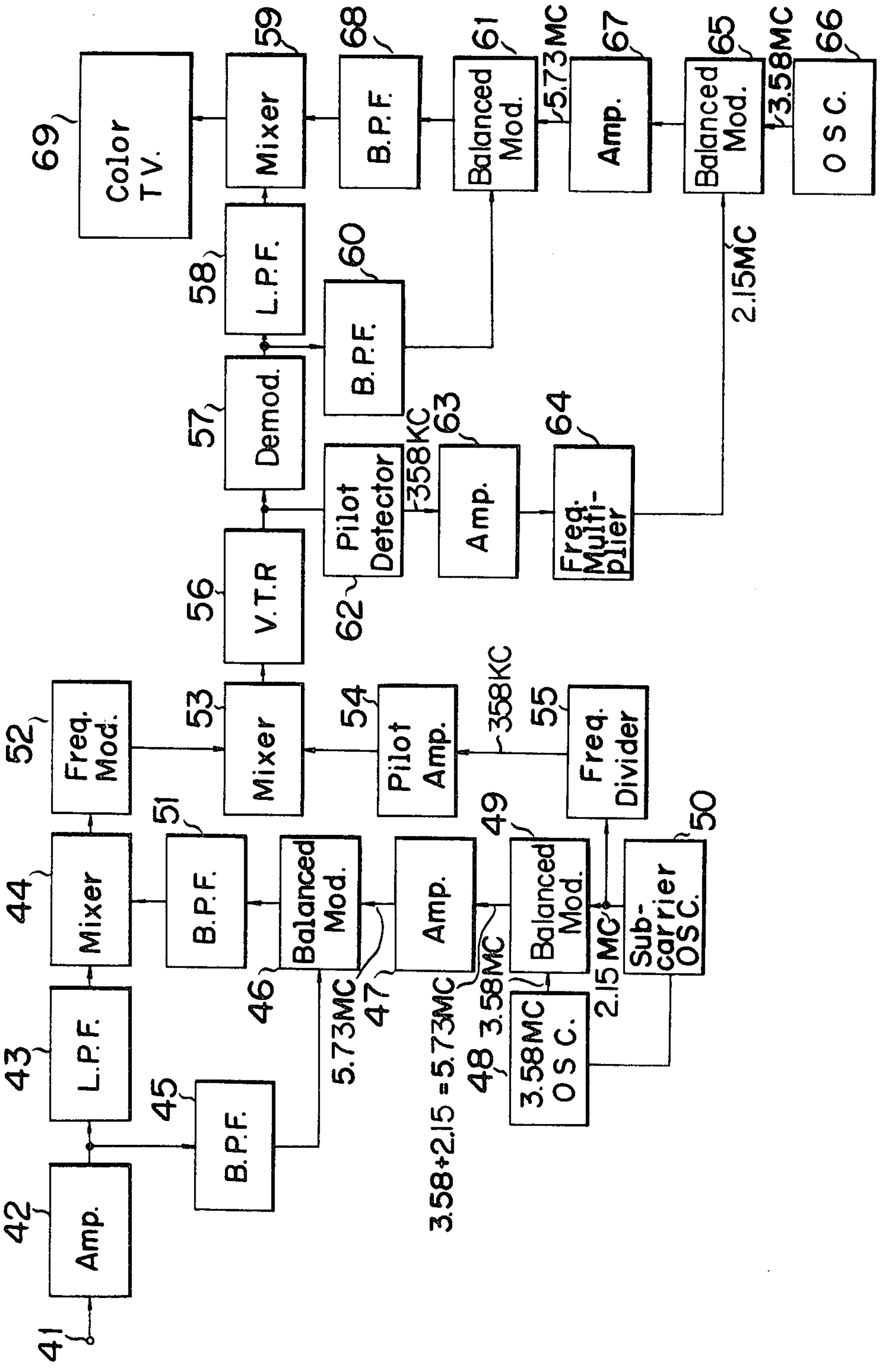
FIGS. 8 to 10 are circuit diagrams illustrating various embodiments of this invention.

However, with the circuit construction shown in FIG. 8, it is necessary to use independent circuits for the recording system of the color television signal and for the reproducing system thus requiring a large number of circuit components with the result that the cost is increased.

Figure 9:
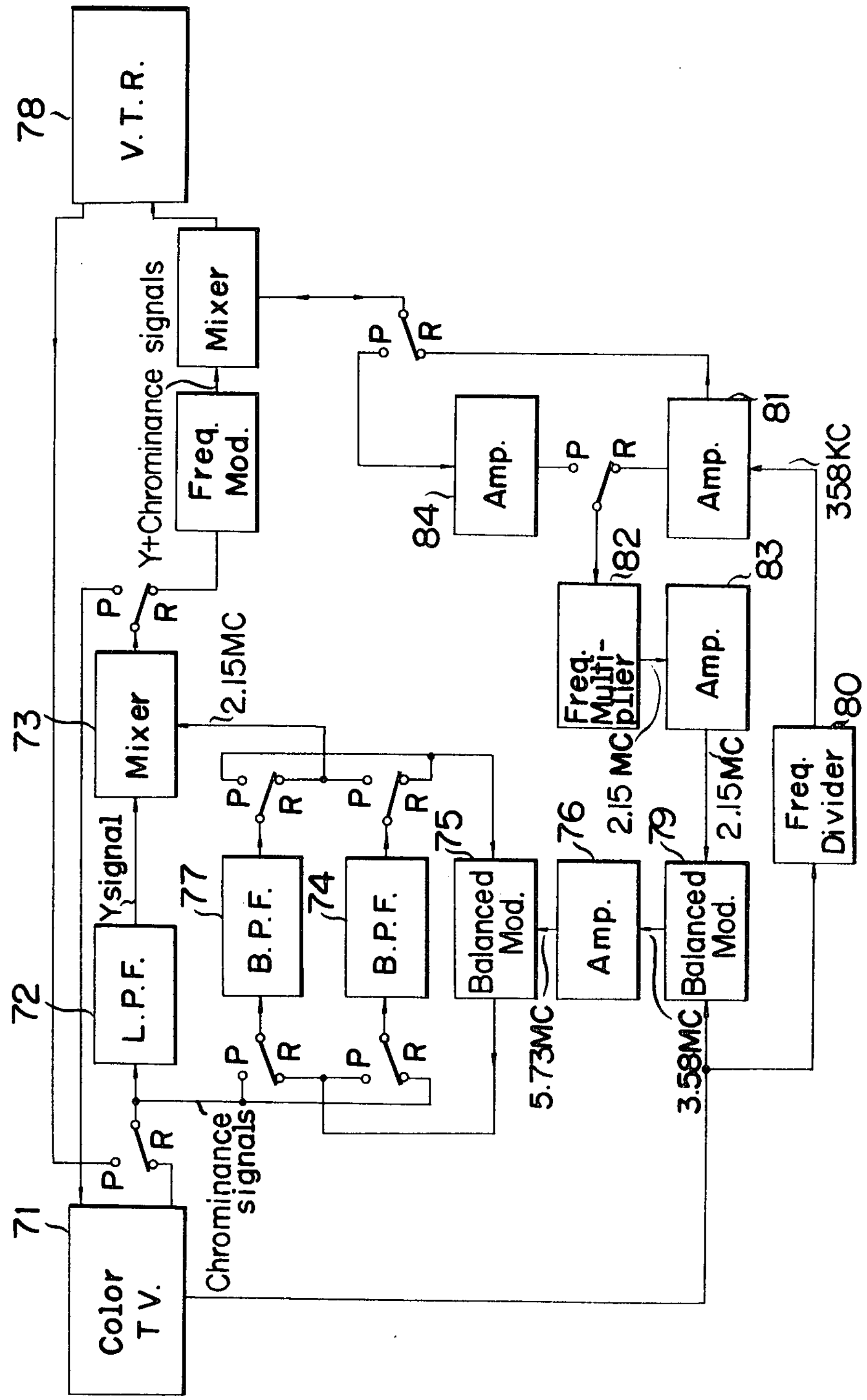

FIG. 9 shows a modified embodiment of this invention requiring fewer components. However, as the basic operation of the embodiment shown in FIG. 9 is the same as that shown in FIG. 8, its operation will be described briefly. In FIG. 9 symbols P and R associated with various switches represent terminals R to which the movable contacts engage at the time of recording and terminals P to which the movable contacts engage at the time of reproducing.

The color television signal of the NTSC system is derived from a color television receiver 71. The color television signal is applied to a low-pass filter 72 to mainly extract the luminance signal component distributed in the low frequency region of the television signal, which is then supplied to a mixer 73. The color television signal is also introduced into a band-pass filter 74. As this filter is designed to pass the signal component of 3.58 mc. ±0.5 mc. or a signal component having a frequency close to that of the subcarrier wave, in effect, the chrominance signal passes through the filter 74. In a balanced modulator 75, the chrominance signal passed through the filter 74 is mixed with the converted signal of 5.73 mc. supplied by an amplifier 76.

By the mixing action of modulator 75, the chrominance signal is converted into a signal having a frequency in a frequency range distributed about 2.15 mc. corresponding to the difference between 5.73 mc. and 3.58 mc.

The frequency converted chrominance signal is applied to said mixer 73 through a band-pass filter 77 which permits to pass frequencies close to 2.15 mc. and mixed with the luminance signal from the low-pass filter 72. The mixed signal is recorded by a video tape recorder 78 as the modulated wave produced by effecting frequency modulation of a carrier wave of a predetermined frequency.

The converted signal to be applied to the balanced modulator 75 is formed in the following manner. At first the subcarrier wave signal of 3.58 mc. is derived concurrently with the derive out of the color television signal from color television receiver 71.

This subcarrier wave signal is supplied to a balanced modulator 79 and a frequency divider 80. The frequency of the subcarrier wave signal applied to the divider 80 is reduced to 1/10 thus producing a signal of 358 kc. After being amplified by an amplifier 81, this frequency divided signal of 358 kc. is divided into two portions, one portion thereof being applied to a frequency multiplier 82 while the other to the video tape recorder as the pilot signal which is recorded on a magnetic tape by means of the same magnetic head together with a signal modulated with the color television signal applied from said mixer 73.

The frequency of the signal supplied to said frequency multiplier 82 is multiplied by the factor of 6 to produce a signal having frequency of 2.15 mc. This signal is then amplified by an amplifier 83 and supplied to the modulator 79 to which is also applied the subcarrier wave signal having a frequency of 3.58 mc. Thus the modulator produces a converted signal having a frequency of 5.73 mc. corresponding to the sum of 3.58 mc. and 2.15 mc. After being amplified by an amplifier 76, this converted signal is then supplied to the modulator 75 to effect frequency conversion of the chrominance signal also applied to the mixer.

Having described the recording operation of the color television signal, the operation of reproduction will be described hereunder.

During reproduction, the modulated wave and the pilot signal are reproduced by the same magnetic head as in the case of recording. The modulated wave in the reproduced signal is detected by a frequency descriminator or the like and is then applied to the low-pass filter 72 and a band-pass filter 77. From the chrominance signal supplied to the low-pass filter 72 is selectively derived the luminance signal distributed in the low-frequency region. On the other hand the chrominance signal component distributed about 2.15 mc. is derived out from the band-pass filter 77. The chrominance signal derived from the band-pass filter 77 is mixed with the converted signal supplied from the amplifier 76 in the modulator 75 to be frequency converted into the original frequency region of the chrominance signal having the center at 3.58 mc. In the modulator 75, the chrominance signal is frequency converted while at the same time its component representing phase variation introduced at the time of reproduction is compensated for.

The frequency converted chrominance signal is then supplied to the mixer 73 via the band-pass filter 74 to be mixed with the luminance signal thus reproducing the normal color television signal of the NTSC system.

While signal components in high frequency region are lost from the reproduced color television signal, this loss does not cause any trouble for practical use. The reproduced color television signal is supplied to the color television receiver 71 to reproduce the color picture image.

The phase shift of the chrominance signal is compensated for in the following manner.

The previously recorded pilot signal is reproduced from the video tape recorder concurrently with the modulated wave. Accordingly, the modulated wave is subjected to the same phase shift as the pilot signal reproduced at the same time. The pilot signal is then supplied to a frequency multiplier 82 through an amplifier 84 and its frequency is increased by a factor of 6 to produce a signal having a frequency of 2.15 mc. This signal is supplied to the modulator 79 to be mixed with a signal of 3.58 mc. supplied from the television receiver 71 whereby a converted signal is formed having a frequency of 5.73 mc. corresponding to the sum of said two signals. Thus, as the converted signal is the sum of the stable subcarrier wave signal and a signal having a component representing phase variation reproduced from the video tape recorder 78 it will have the same component representing phase variation when the chrominance signal contains a component representing phase variation.

As a consequence, the chrominance signal and the converted signal having identical components representing phase variation will be mixed in the modulator 75 thus effecting frequency conversion concurrently with the cancelling out of the components representing phase variation.

In the circuit construction shown in FIG. 9 since the subcarrier wave of the color television receiver is utilized to form the converted signal which is used at the time of reproduction the subcarrier wave in the chrominance signal at the time of recording and the subcarrier wave contributing to the formation of the converted signal at the time of reproduction can be supplied from the same signal source thus enabling high-fidelity reproduction.

In the foregoing embodiments of this invention, as the luminance signal and the chrominance signal are mixed and then recorded in order to prevent interference therebetween, it is necessary to remove the luminance signal from the frequency region containing the chrominance signal prior to their mixing.

With the circuit construction illustrated in FIG. 9, there has been used a signal of 3.58 frequency supplied from the color television apparatus as a conversion signal for the frequency conversion of the chrominance signal in reproducing and recording the color television signal. However, experiments of the present inventors have ascertained that the use of a stable oscillator such, for example, as a crystal oscillator enables even an independent oscillator not synchronized with the burst signal included in the color television signals to be put to practical use. Thus the application of such an independent oscillator will eliminate a complicated circuit such as a gate circuit to extract the burst signal or an automatic phase control circuit.

Since it is not required to obtain the burst signal from the color television signal there is further advantage that it is possible to record the color television signal from the plain television to which color signals are additionally supplied.

Such removal of a portion of the luminance signal results in the decrease in the utility thereof and hence degrading the resolution. Consequently, it is advantageous to superpose the luminance signal upon the chroma signal such that the luminance signal would not be affected.

Figure 10:
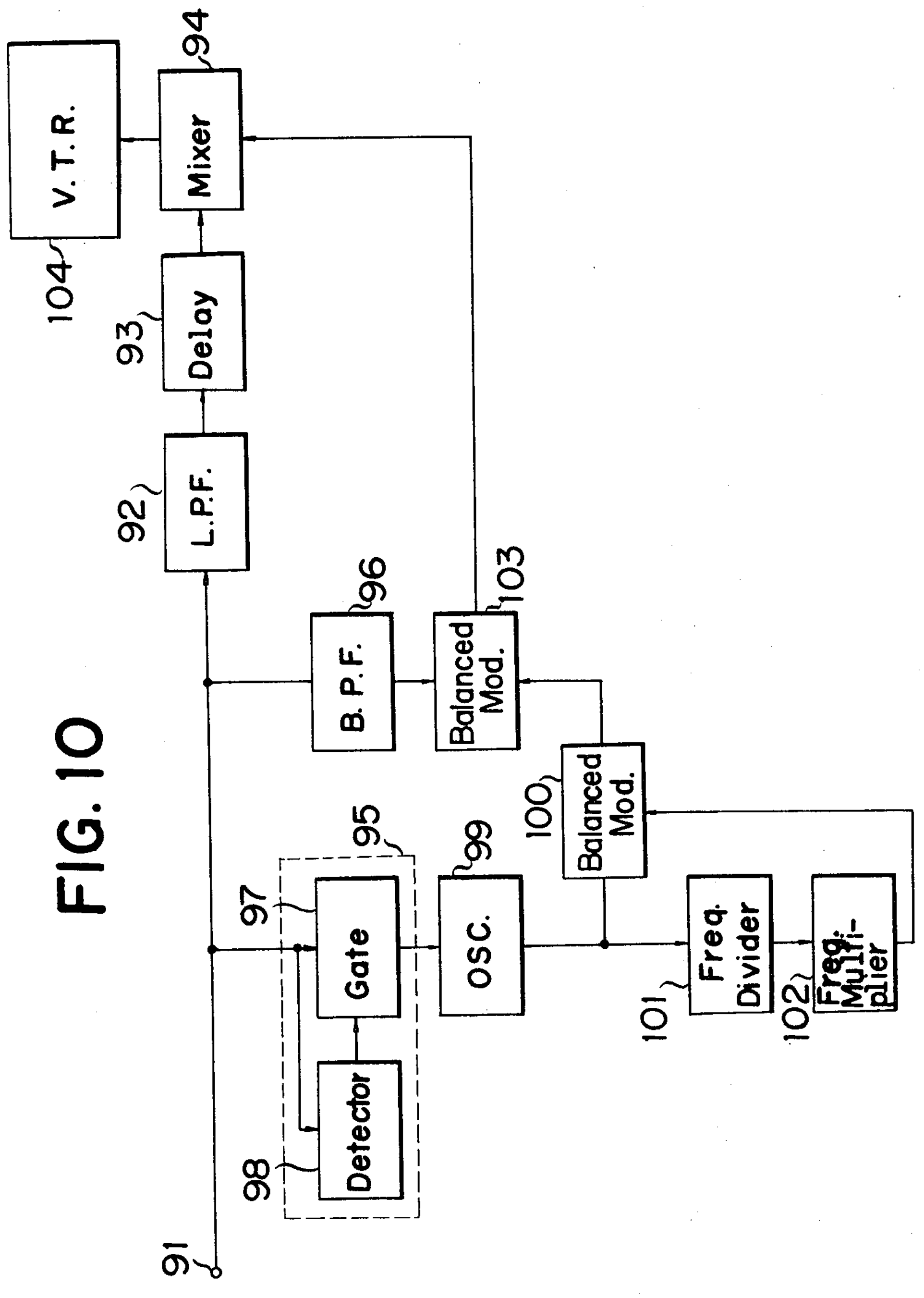

In FIG. 10 there is shown a circuit arrangement wherein the luminance signal is superposed upon the chrominance signal without affecting the former.

A color television signal comprised by a chrominance signal produced by modulating a carrier wave having a frequency of 3.58 mc. and a luminance signal representing the tone of the picture image is supplied to a terminal 91. The image signal supplied to terminal 91 is applied to a low-pass filter 92 to remove the luminance signal component distributed in the high band.

The signal passed through the low-pass filter 92 is passed through a delay circuit 93 to delay it by a predetermined time and the delayed signal is then supplied to a succeeding mixer 94.

The color television supplied to the terminal 91 is also supplied to a burst signal selector 95 and to a band-pass filter 96, the former extracting only the burst signal contained in the television signal.

More particularly, the television signal is applied to a burst gate 97 of the burst selector 95 as well as to a synchronous detector 98 which functions to extract the horizontal synchronizing signal contained in the television signal. The horizontal synchronizing signal is then applied to the burst gate 97 whereby the burst signal can be extracted from the burst gate 97 by gating the television signal supplied from terminal 91 in synchronism with the selecting operation of the horizontal synchronizing signal.

The burst signal is supplied to a phase synchronizing oscillator 99 including a quartz oscillator to procure a reference signal having the same frequency as the burst signal and is synchronized therewith in phase. A portion of the reference signal is supplied to a balanced modulator 100 while the other portion to a frequency divider 101. In the frequency divider the frequency of the reference signal is reduced to $1/m$, where m represents an odd integer, for example 5, 7 or 13. In the succeeding frequency multiplier 102 the frequency of this signal is multiplied by $n$ where $n$ represents an odd integer smaller than $m$, for example, 3, 5 or 7, to reduce frequency of the subcarrier wave to three-fifths, five-sevenths or seven-thirteenths to form a signal having a frequency lower than that of the subcarrier wave.

This signal of the predetermined frequency can be selected in the following manner.

Thus, 3.58 mc. the frequency of the subcarrier wave signal, can be given by the following equation. $H/2 \times 455 = H/2 \times 5 \times 7 \times 13$ (1) where $H$ represents the repeating frequency of the horizontal synchronizing signal.

Accordingly it is advantageous to select as the frequency of said predetermined value the value obtained by substituting 3 for 5 in equation (1) or the value obtained by substituting 5 or 3 for 7 or the value obtained by substituting 11, 9 or 7 for 13. In other words, for substituting 3 for 5 in the equation (1 1), the frequency of a signal is reduced to one-fifth by the frequency divider 101 and is then multiplied by 3 by the frequency multiplier 102 to obtain the signal having the desired frequency.

In this manner, the desired frequency should be selected to a value obtained by reducing the subcarrier frequency to one-seventh or one-thirteenth and then multiplying it by an odd number.

Thus frequencies usable for the prescribed signal are 3.58 mc. ×3 /5 =2.147727mc.

3.58mc. ×3/7 =1.534091 mc.

3.58mc. ×5/7 =2.55618mc.

3.58mc. ×7/13 =1.927447mc.

3.58mc. ×9/13 =2.478147mc.

3.58mc. ×11/13 =3.028846mc.

The frequency having a value obtained by dividing and multiplying the subcarrier frequency also includes the frequency obtained by first dividing by 10 and then multiplying by 6. Because it is equivalent to the frequency obtained by dividing by 5 and then multiplying by 3. In other words the resulting frequencies correspond to a value obtained by dividing the subcarrier wave by an odd number and then multiplying by a smaller odd number than that of the former.

The prescribed signal having the above-described frequency is then supplied to the modulator 100 which is also supplied with the reference signal produced by the phase synchronizing oscillator 99, thus effecting mixing of the reference signal and the prescribed signal, thereby forming a signal (hereinafter referred to as a converted signal) having a frequency corresponding to the sum of the mixed signals. The converted signal is supplied to a succeeding balanced modulator 103.

The chrominance signal distributed close to the subcarrier wave extracted by the band-pass filter 96 is also supplied to the second modulator 103 to be mixed with the converted signal.

Since these two signals are mixed the second modulator 103, the chrominance signal distributed over the proximity of the subcarrier wave will be led out of the modulator 103 with the frequency obtained by dividing the subcarrier wave into m portions and then multiplying the same n times, namely, in the state of frequency converted to that chrominance signal which will distribute as a carrier wave the signal having the same number of frequency as the prescribed signal.

The frequency converted chrominance signal will then be supplied to a mixer 94 to be mixed with the luminance signal supplied thereto through the delay circuit 93. The signal mixed by the mixer 94 is utilized to effect frequency modulation of a predetermined carrier wave and the modulated wave is recorded on a video tape recorder 104.

In recording the frequency modulated wave, of course a predetermined pilot signal is recorded concurrently in order to compensate for the component representing phase fluctuation of the reproduced chrominance signal. However description of a circuit for this purpose is believed unnecessary since it is identical to that already described. The reproducing operation is also identical.

With the circuit arrangement shown in FIG. 10 as the chrominance signal and the luminance signal are in offset relation it becomes possible to mix the chrominance signal without removing the luminance signal thus preventing reduction in the resolution.

FIG. 11A illustrates the frequency distribution of color television signals of the NTSC type before the frequency of the subcarrier wave is converted by the video tape recorder system of the invention, and FIG. 11B represents the frequency distribution of color television signals after the frequency of the subcarrier wave contained in the television signals shown in FIG. 11A is converted by said system. In these figures, A represents the luminance signal component contained in the television signals, while B denotes the chrominance signal component and C the frequency of the subcarrier wave.

While the invention has been described in connection with some preferred embodiments thereof, the invention is not limited thereto and includes any modifications and alterations which fall within the true spirit and scope of the invention as defined in the appended claims.

We claim:

1. A recording device for a video tape recorder comprising:

first means for receiving an original color television signal containing an original luminance signal component representing the contrast of picture elements and an original chrominance signal component which is obtained by modulating a first subcarrier wave with color signals;

second means coupled to said first means for filtering out the original chrominance signal component from the original color television signal;

third means for providing a reference subcarrier wave having a frequency equal to and synchronized with that of the first subcarrier wave;

fourth means for providing a quasi-subcarrier wave whose frequency is $n/m$ times that of the first subcarrier wave, where $n$ and $m$ are odd integers and $n$ is smaller than $m$;

fifth means coupled to both said third and fourth means for forming a signal whose frequency corresponding to a sum of the frequencies of the reference subcarrier wave and of the quasinsubcarrier wave;

sixth means coupled to both said second and fifth means for frequency-shifting the original chrominance signal component located about the first subcarrier wave into a new chrominance signal component located about the quasi-subcarrier wave; seventh means coupled to said first means for filtering out only a new luminance signal component distributed in a slightly higher frequency region than that of the quasi-subcarrier wave from the original luminance signal component included in the original color television signal;

eight means coupled to both said sixth and seventh means for mixing the filtered new luminance signal component with the frequency-shifted new chrominance signal component, thereby forming a new color television signal whose bandwidth is more reduced than that of the original color television signal;

ninth means coupled to said eight means for frequency modulating a carrier wave with said new color television signal to produce a modulated wave;

tenth means for providing a pilot signal related to said first subcarrier wave;

eleventh means for superposing said modulated signal on said pilot signal to produce a superposed signal; and twelfth means for recording said superposed signal on a magnetic medium by means of a common magnetic head.

2. Apparatus according to claim 1 wherein said original color television signal includes a color burst signal and wherein said third means comprises detecting means coupled to said means for receiving said original color television signal, for detecting said color burst signal.

3. Apparatus according to claim 1 wherein said original color television signal includes a horizontal synchronizing signal and a color burst signal, and wherein said third means comprises:

a synchronous detector for extracting the horizontal synchronizing signal from the original color television signal;

a burst gate for extracting the burst signal from the original color television signal by gating the original color television signal in synchronism with the detection of the horizontal synchronizing signal in said synchronous detector; and a phase synchronizing oscillator for generating the reference subcarrier wave having the same frequency as the burst signal from said burst gate and synchronized therewith in phase.

4. Apparatus according to claim 1, wherein said fourth means comprises:

a frequency divider for dividing the frequency of the reference subcarrier wave by $m$; and a frequency multiplier for multiplying the frequency of the frequency-divided signal from said frequency divider by $n$.

5. Apparatus according to claim 1 wherein said sixth means comprises means for combining the filtered original chrominance signal from said second means with the signal having a frequency equal to a sum of those of the reference subcarrier wave and the quasi-subcarrier wave from said fifth means and for forming a difference frequency signal between said combined signals.

6. Apparatus according to claim 1 wherein said tenth means comprises means for frequency dividing by said m value the frequency of said first subcarrier wave.

7. Apparatus according to claim 1 wherein said odd integer $m$ in said fourth means is equal to one of 5, 7 or 13, and said odd integer $n$ is equal to one of 3, 5, 9 or 11, $n$ being smaller than $m$.

8. Apparatus according to claim 1 wherein said twelfth means comprises means for supplying a bias current to said common magnetic head, said bias current lying in a range between a first value which gives the maximum reproduced output and a second value which is approximately one half of said first value.

9. Apparatus according to claim 1 wherein said signals recorded on said magnetic medium are subjected to phase fluctuation during said recording, further comprising means for reproducing said new color television signal including:

thirteenth means for driving the recorded signal from said magnetic medium by means of a common magnetic head, said derived signal including the new color television signal component comprising the new luminance and chrominance signal components and the pilot signal component, both having substantially the same phase fluctuation;

fourteenth means coupled to said thirteenth means for demodulating said new color television signal component included in said derived signal;

fifteenth means coupled to said thirteenth means for detecting said pilot signal component included in said derived signal;

sixteenth means coupled to said fifteenth means for multiplying the frequency of said pilot signal component by said n value, thereby forming a signal having a frequency equal to that of said quasi-subcarrier wave;

seventeenth means for providing a reference subcarrier wave having a frequency equal to and synchronized with that of said first subcarrier wave;

eighteenth means coupled to both said sixteenth and seventeenth means for forming a signal whose frequency corresponds to a sum of the frequencies of the reference subcarrier wave and the frequency-multiplied pilot signal component;

nineteenth means coupled to said fourteenth means for filtering out the new chrominance signal component from said new color television signal;

twentieth means coupled to both said eighteenth and nineteenth means for changing the frequency of the new chrominance signal component located about the quasi-subcarrier wave back to that of the original chrominance signal component located about said first subcarrier wave;

twenty-first means coupled to said fourteenth means for filtering out the new luminance signal component from said new color television signal; and twenty-second means coupled to both said twentieth and twenty-first means for mixing the filtered new luminance signal component with the original chrominance signal component whose frequency has thus been changed back to its initial level, thereby producing a color television signal to be reproduced on a color television receiver, the produced signal being compensated for said phase fluctuation.